(12) United States Patent
Takeyama et al.

(10) Patent No.: US 12,466,959 B2
(45) Date of Patent: Nov. 11, 2025

(54) METHOD FOR REMOVING FOREIGN MATERIAL FROM CARBONACEOUS MATERIAL DISPERSION

(71) Applicant: REFINE HOLDINGS CO., LTD., Gifu (JP)

(72) Inventors: Tomokiyo Takeyama, Tokyo (JP); Masaru Nakajo, Tokyo (JP); Kensuke Fukasawa, Tokyo (JP); Takao Suzuki, Tokyo (JP)

(73) Assignee: REFINE HOLDINGS CO., LTD., Gifu (JP)

( * ) Notice: Subject to any disclaimer, the term of this patent is extended or adjusted under 35 U.S.C. 154(b) by 975 days.

(21) Appl. No.: 17/470,417

(22) Filed: Sep. 9, 2021

(65) Prior Publication Data

US 2022/0073752 A1 Mar. 10, 2022

(30) Foreign Application Priority Data

Sep. 10, 2020 (JP) ................. 2020-152275

(51) Int. Cl.
*C09C 1/56* (2006.01)
*B01D 29/56* (2006.01)
(Continued)

(52) U.S. Cl.
CPC ............... *C09C 1/56* (2013.01); *B01D 29/56* (2013.01); *B01D 29/885* (2013.01); *B01D 35/06* (2013.01);
(Continued)

(58) Field of Classification Search
CPC .. C09C 1/56; C09C 1/48; B01D 29/56; B01D 29/885; B01D 35/06; B01D 37/00;
(Continued)

(56) References Cited

FOREIGN PATENT DOCUMENTS

| CN | 109152994 A | 1/2019 |
| JP | 2005-113091 | 4/2005 |

(Continued)

OTHER PUBLICATIONS

Machine translation of JP-2011241324-A (Year: 2011).*
Office Action issued in CN Patent Application No. 202111054778.7, Aug. 2, 2025, translation.

*Primary Examiner* — Sally A Merkling
*Assistant Examiner* — Logan Edward Laclair
(74) *Attorney, Agent, or Firm* — GREENBLUM & BERNSTEIN, P.L.C.

(57) ABSTRACT

A method for efficiently removing non-magnetic foreign material, from a carbonaceous material dispersion in which carbonaceous material particles are dispersed in a dispersing medium, includes applying the dispersion to a primary filter a specified number of times in circulation, the primary filter including at least one filter device; and applying the dispersion treated with the primary filter to a secondary filter a single time, the secondary filter including at least two filter devices arranged in series. Each respective filter device to be used satisfying following conditions: (a) a variation of cumulative undersize distribution Q [%] with respect to a reference particle diameter and a variation of non-volatile content, before and after passing the carbonaceous material dispersion, being not more than 0.1%, respectively; and (b) a removal rate of particles with a threshold particle diameter being not less than 20%.

8 Claims, 1 Drawing Sheet

(51) Int. Cl.
- *B01D 29/88* (2006.01)
- *B01D 35/06* (2006.01)
- *B01D 37/00* (2006.01)
- *B03C 1/30* (2006.01)
- *C09C 1/48* (2006.01)

(52) U.S. Cl.
CPC ............. *B01D 37/00* (2013.01); *B03C 1/30* (2013.01); *C09C 1/48* (2013.01); *B01D 2257/60* (2013.01); *B01D 2259/814* (2013.01); *B03C 2201/18* (2013.01); *C01P 2004/61* (2013.01); *C01P 2004/62* (2013.01); *C01P 2006/80* (2013.01)

(58) Field of Classification Search
CPC ......... B01D 2257/60; B01D 2259/814; B01D 35/00; B03C 1/30; B03C 2201/18; B03C 1/28; B03C 2201/20; C01B 32/01; C01P 2004/61; C01P 2004/62; C01P 2006/80; C01P 2004/50; C01P 2004/64; C01P 2006/22
USPC ............................................................ 423/4
See application file for complete search history.

(56) References Cited

FOREIGN PATENT DOCUMENTS

| | | |
|---|---|---|
| JP | 2009-138054 | 6/2009 |
| JP | 2011-241324 | 12/2011 |
| JP | 2011241324 A * | 12/2011 |
| JP | 2015-065097 | 4/2015 |
| JP | 2015065097 A * | 4/2015 |
| JP | 2015-191756 | 11/2015 |
| WO | 2013/099106 | 7/2013 |

* cited by examiner

METHOD FOR REMOVING FOREIGN MATERIAL FROM CARBONACEOUS MATERIAL DISPERSION

CROSS-REFERENCE TO RELATED APPLICATIONS

This application is based on and claims priority to Japanese Patent Application No. 2020-152275 filed on Sep. 10, 2020, which is hereby incorporated by reference as if set forth in its entirety herein.

TECHNICAL FIELD

The present invention relates to a method for removing foreign material. In detail, the present invention relates to a technology for efficiently removing foreign material, especially non-magnetic foreign material, which is mixed in, for example, a carbonaceous material dispersion.

BACKGROUND ART

Conventionally, carbon materials such as carbon black, graphite, carbon nanotubes, carbon nanofibers, carbon fibers, and fullerene have been used as black pigment, black filler, light shielding material, and conductive material in a wide range of fields such as toners, printing inks, inkjet inks, writing inks, paints, rubber compositions, plastic compositions, or electrode forming materials and conductive layer forming materials in the battery and semiconductor fields.

Taking carbon black as an example among the carbon materials mentioned above, carbon black can be classified into three types: (a) furnace black obtained by the furnace method, in which oil or gas is incompletely burned in high-temperature gas to obtain carbon black; (b) channel black obtained by the channel method, in which natural gas is burned and deposited on a channel steel, which is then scraped up; (c) acetylene black obtained by the acetylene method, in which acetylene gas is thermally decomposed to obtain carbon black; and (d) thermal black obtained by the thermal method, which produces carbon black by repeatedly burning and decomposing gas in a furnace with heat storage. The raw materials for these carbon blacks include metallic components such as Fe and Cu. These metallic components are concentrated during the carbon black producing process, and other metallic components and further other impurities are also able to get mixed in the carbon black from cooling water and producing facilities, resulting in carbon black containing various metallic components and the other impurities.

Therefore, in applications such as batteries and semiconductors, where contamination by metallic components or the other impurities is extremely unacceptable, it is necessary to remove those metallic components and the other impurities and make the carbon material highly pure.

For example, the presence of metallic foreign contamination in the carbonaceous material, which is the conductive auxiliary agent for forming electrodes of lithium-ion secondary batteries, is a cause of dendritic lithium metal deposits, which can lead to internal short circuit. Therefore, the removal of the metallic foreign contamination is desirable for the lithium-ion secondary batteries in general.

Among the metallic components and other impurities contained in such carbonaceous materials, magnetic components may be removed by using a magnet such as a magnetic filter. For example, although not targeting carbonaceous materials, Patent Literature 1 proposed a method of removing magnetic materials from a slurry containing non-conductive particles by placing a magnet such as a magnetic filter in the flow of the slurry. In addition, Patent Literature 2 proposed a method which comprises a dispersion step of bringing a slurry composition for a rechargeable battery containing carbon particles of a predetermined particle diameter range, a particulate binder and a dispersing medium into a predetermined viscosity condition; and a removing step of removing particulate metallic components containing at least one metal selected from the group consisting of Fe, Ni, and Cr in the slurry composition for a rechargeable battery that has been dispersed by the dispersion step by a magnet provided with a magnet cover of a Vickers hardness of not less than 10 GPa and less than 25 GPa.

However, non-magnetic components among the metallic component and other impurities contained in the carbonaceous material cannot be removed by using a magnet as described above, and must be removed by a separate method.

As a method for removing a metal component from a carbonaceous material dispersion, for example, as shown in Patent Literature 3, a method wherein an aqueous dispersion of carbon black is brought into contact with a variety of water-soluble chelating agents, in order to elute the metallic components contained in the carbon black, to capture them by the chelating agents, and to transfer them to the liquid phase, which is followed by solid-liquid separation, and as shown in Patent Literature 4, a method which includes a step wherein an aqueous dispersion of carbon black is brought into contact with a cation exchange resin, have been proposed.

However, the methods as shown in Patent Literatures 3 and 4 are for foreign materials to be captured by metal ions, and do not target solid particles that cannot be removed by such chelating agents or ion exchange resins. In addition, the chemical removal method using the chelating agents as shown in Patent Literature 3, requires an additional treatment step to separate the added chelating agent from the carbon black, which makes the process complicated and costly to manufacture. In addition, the dispersing system in which the chelating agent can be added is practically limited to aqueous systems, and it is not suitable for processing non-aqueous dispersions for solid electrolyte lithium secondary batteries, which do not like the presence of moisture. Even in the case of using an ion exchange resin as shown in Patent Literature 4, a further treatment step is required to separate the added ion exchange resin from the carbon black, which makes the process more complicated. In addition, since the ion exchange resin is in the form of particles, there is a fear that the amount of carbon black removed from the system along with the ion exchange resin to be removed will increase, and the yield will become low.

It has also been proposed to improve filtration efficiency by using a depth filter for filtration of general raw water and solutions (e. g., Patent Literature 5). Further, in Patent Literature 6, it has also been proposed to use a depth filter in selectively removing coarse particles contained in an aqueous emulsion.

PRIOR ART DOCUMENT

Patent Literature

Patent Literature 1: JP 2015-065097 A
Patent Literature 2: JP 2015-191756 A
Patent Literature 3: JP 2005-113091 A Patent Literature 4: JP 2009-138054 A
Patent Literature 5: International Publication WO2013/099106
Patent Literature 6: JP 2011-241324 A

SUMMARY OF THE INVENTION

Problem to be Solved by the Invention

Therefore, physical filtration using a filter such as a depth filter can be considered as a method of removing non-magnetic impurities from a carbonaceous material dispersion.

However, when the medium to be treated is a dispersion of carbonaceous materials or the like, the medium itself contains target particles having a desired particle diameter, so it is necessary to remove the foreign materials by using a relatively coarse filter that does not trap the target particles, unlike, for example, filtration of the raw water. When such a coarse filter is used, the removal rate of the foreign materials to be trapped becomes poor, and thus it would be necessary to use a multi-stage system or a circulation system to improve the removal rate.

For example, if filters are installed as a multi-stage for efficient removal in a short time and filtration is performed in one-time pass process (single pass process), the pressure loss in the system increases significantly, making it difficult to pass the medium through. Further, since the product is obtained after all the filters have been passed, the quality of the product can only be checked after all the filters have been passed. Thus, if the product quality deviates from the predetermined target value, it is necessary to redo the process, and if there is a demand for further improvement in the removal rate, additional work on the system should be required.

On the other hand, if the filter is used in a circulation system to prevent a large increase in pressure loss by emphasizing liquid flowability, it is possible to achieve a desired removal rate by adjusting the number of circulation times. However, the circulation system requires a large number of cycles and takes a long time to pass the liquid through, resulting in the problem of unproductiveness.

Accordingly, the present invention aims to provide a foreign material removing method which can solve the above-mentioned problems. The present invention also aims to provide a foreign material removing method which can efficiently remove foreign materials, especially non-magnetic foreign materials, contaminated in a carbonaceous material dispersion.

Means for Solving the Problem

In order to solve the above problem, we, the present inventors have conducted intensive studies and investigations, and as a result, we have found that, in a method for removing foreign material from a dispersion in which target particles of the desired particle diameter or smaller are dispersed in a dispersing medium, such as a carbonaceous material dispersion in which carbonaceous material particles are dispersed in a dispersing medium, it is possible to achieve a high removal rate of the foreign materials with a relatively short processing time by combining a filtration process of a circulation system with another filtration process of a one-pass system which uses multi-stage filters.

Namely, the present invention which solves the above-mentioned problems may be embodied as:

a method for removing foreign material from a carbonaceous material dispersion in which carbonaceous material particles are dispersed in a dispersing medium, the method comprising:

(i) applying the dispersion to a primary filter a specified number of times in circulation, the primary filter comprising at least one filter device, and in the circulation a procedure of applying the dispersion passed through the primary filter to the primary filter again being repeated from the second time until the specified number of times is reached; and (ii) applying the dispersion treated with the primary filter to a secondary filter a single time, the secondary filter comprising at least two filter devices arranged in series;

each respective filter device to be used satisfying following conditions:

(a) a variation of cumulative undersize distribution Q [%] with respect to a reference particle diameter and a variation of non-volatile content, before and after passing the carbonaceous material dispersion, being not more than 0.1%, respectively; and (b) a removal rate of particles with a threshold particle diameter being not less than 20%, when a particle diameter of the carbonaceous material particles with a cumulative frequency of 99.8% or more being set as the reference particle diameter, and a value of at least 5 μm larger than the reference particle diameter being set as the threshold particle diameter.

In one embodiment of the method for removing foreign material according to the present invention, it is shown to collect 99.99% or more of the foreign materials with a particle diameter greater than or equal to the threshold particle diameter.

In one embodiment of the method for removing foreign material according to the present invention, it is shown that each respective filter device to be used satisfies following conditions:

(a) a variation of cumulative undersize distribution Q [%] with respect to a reference particle diameter and a variation of non-volatile content, before and after passing the carbonaceous material dispersion, being not more than 1%, respectively; and (b1) a removal rate of particles with a threshold particle diameter being not less than 50%.

In a further embodiment of the method for removing foreign material according to the present invention, it is shown that each respective filter device to be used in the primary filter satisfies following conditions:

(a) a variation of cumulative undersize distribution Q [%] with respect to a reference particle diameter and a variation of non-volatile content, before and after passing the carbonaceous material dispersion, being not more than 0.1%, respectively; and (b2) a removal rate of particles with a threshold particle diameter being not less than 50% and not more than 80%; and each respective filter device to be used in the secondary filter satisfies following conditions:

(a) a variation of cumulative undersize distribution Q [%] with respect to a reference particle diameter and a variation of non-volatile content, before and after passing the carbonaceous material dispersion, being not more than 0.1%, respectively; and (b3) a removal rate of particles with a threshold particle diameter being not less than 80% and not more than 90%.

In an embodiment of the method for removing foreign material according to the present invention, it is shown that each filter device is a depth filter.

In one embodiment of the method for removing foreign material according to the present invention, it is shown that the carbonaceous material dispersion has been applied to a wet magnetic separation in which the dispersion is passed through a magnetic filter prior to applying it to the primary filter.

In one embodiment of the method for removing foreign material according to the present invention, it is shown that the carbonaceous material used in the carbonaceous material dispersion has been applied to a dry magnetic separation prior to being dispersed in the dispersing medium.

In one embodiment of the method for removing foreign material according to the present invention, it is shown that the carbonaceous material is carbon black, in particular acetylene black.

The present invention which solves the above-mentioned problems may be also embodied as:
- a method for removing foreign materials from a dispersion in which target particles each having a prescribed particle diameter or less are dispersed in a dispersing medium, the method comprising:
  (i) applying the dispersion to a primary filter a specified number of times in circulation, the primary filter comprising at least one filter device, and in the circulation a procedure of applying the dispersion passed through the primary filter to the primary filter again being repeated from the second time until the specified number of times is reached; and
  (ii) applying the dispersion treated with the primary filter to a secondary filter a single time, the secondary filter comprising at least two filter devices arranged in series;
  each respective filter device to be used satisfying following conditions:
  (a) a variation of cumulative undersize distribution Q [%] with respect to a reference particle diameter and a variation of non-volatile content, before and after passing the dispersion, being not more than 0.1%, respectively; and
  (b) a removal rate of particles with a threshold particle diameter being not less than 20%,
  when a particle diameter of the carbonaceous material particles with a cumulative frequency of 99.8% or more being set as the reference particle diameter, and a value of not less than three times a particle diameter $D_{90}$ which is the size when a cumulative frequency is 90% in the particle diameter distribution of the target particles being set as the threshold particle diameter.

the method for removing foreign material according to the present invention, it is shown that a span, S, of the particle diameter distribution of the target particles in the dispersion is not more than 5. Herein, the span, S is defined as follows:

Span $S=(D_{90}-D_{10})/D_{50}$ wherein, $D_{90}$, $D_{10}$ and $D_{50}$ are the particle diameters at which the cumulative frequencies in the volume-based particle diameter histogram of the particles are 90%, 10% and 50%, respectively.

Effect of the Invention

According to the present invention, it is possible to efficiently remove foreign materials, even non-magnetic materials, from a dispersion in which target particles are dispersed in a dispersing medium, such as a carbonaceous material dispersion in which carbonaceous material particles are dispersed in a dispersing medium, with a high removal rate and in a relatively short time.

EMBODIMENTS FOR CARRYING OUT THE INVENTION

The present invention will now be described in detail based on embodiments. In the following, the present invention will be described mainly in terms of a carbonaceous material dispersion in which carbonaceous material particles are dispersed in a dispersing medium as the dispersion to be treated. However, it should be noted that the foreign material removal method according to the present invention is not particularly limited to such carbonaceous material dispersions, and is applicable to any dispersion in which the target particles of the desired diameter or less are dispersed in a dispersing medium.

A foreign material removal method according to a first aspect of the present invention is a method for removing foreign materials from a carbonaceous material dispersion in which carbonaceous material particles are dispersed in a dispersing medium. This method comprises:
  (i) a first process of applying the dispersion to the primary filter comprising at least one filter device, a specified number of times in a circulation system, in the circulation system a procedure of applying the dispersion passed through the primary filter to the primary filter again being repeated from the second time until the specified number of times is reached; and
  (ii) a second process of applying the dispersion treated in the first process to a secondary filter comprising at least two filter devices arranged in series a single time;
  wherein each respective filter device to be used satisfies following conditions:
  (a) a variation of cumulative undersize distribution Q [%] with respect to a reference particle diameter and a variation of non-volatile content, before and after passing the carbonaceous material dispersion, are not more than 0.1%, respectively; and
  (b) a removal rate of particles with a threshold particle diameter is not less than 20%,
  when a particle diameter of the carbonaceous material particles with a cumulative frequency of 99.8% or more is set as the reference particle diameter, and a value of at least 5 μm larger than the reference particle diameter is set as the threshold particle diameter.

Thus, in the present invention, by combining a process of applying a carbonaceous material dispersion to a filter in a circulation system (first process) and a process of passing the dispersion through a plurality of filters arranged in a multi-stage system a single time (second process), it is possible to remove the foreign materials from the dispersion in which target particles are dispersed in a dispersing medium, such as a carbonaceous material dispersion in which carbonaceous material particles are dispersed in a dispersing medium, with a high removal rate and in a relatively short time.

In the foreign material removal method according to the present invention, the filter device used in the first or second process may be either a surface filter such as a membrane filter or a depth filter. However, it is preferable that the filter is a depth filter because the material to be treated is a dispersion in which target particles such as carbonaceous material particles are dispersed in a dispersing medium and the target particle is not substantially captured even though the foreign material particles may be captured by the filter.

Unlike the surface filter (a filter that captures particulate materials in a fluid mainly on the surface of the filter), the depth filter captures the particulate materials in a fluid mainly on the inside of the filter material, and is characterized by its high particle retention performance and resistance to clogging up. By using a depth filter, foreign materials in the dispersion can be removed more selectively.

A variety of materials can be used in the manufacture of the depth filter, one example being, for example, a nonwoven medium of melt blown or spun bonded filaments. The depth filter may be provided in the form of a tubular sleeve or a flat sheet, for example. For example, fibers wrapped around a core, a nonwoven fabric wrapped around a core, heat-welded fibers, extruded fibers, and the like can be exemplified, but in the present invention, there is no particular limitation with respect to the form, etc. of the depth filter used.

The material used for depth filters is also not limited to any one material. For example, as a synthetic fiber, thermomeltable polymers including polyolefins such as polypropylene, polyesters, nylons and ethylene vinyl alcohol copolymers; or polyvinyl alcohols or polyacrylonitrile polymers may be used.

In the present invention, the filtration accuracy is important in selecting the filters used in the first and second processes, particularly the depth filters as described above.

In order to increase the removal rate on removing the foreign materials from the carbonaceous material dispersion to be treated, the use of a filter with a smaller pore size may be considered. However, if the pore size is made smaller than necessary, the carbonaceous material in the carbonaceous material dispersion will also be trapped in the filter, or the particle diameter distribution of the carbonaceous material will be affected when passing through the pores of the filter, or the filter is clogged and the pressure loss during filtration operation becomes large, and there is a possibility that the pressure pumping devices such as pumps need to be increased, or the filter becomes inoperable.

For this reason, in the present invention, as each filter device, a filter which satisfies the following conditions should be used:
    assuming that a particle diameter of the carbonaceous material particles with a cumulative frequency of 99.8% or more is set as the reference particle diameter, and a value of at least 5 µm larger than the reference particle diameter is set as the threshold particle diameter;
    (a) a variation of cumulative undersize distribution Q [%] with respect to a reference particle diameter and a variation of non-volatile content, before and after passing the carbonaceous material dispersion, being not more than 0.1%, respectively; and
    (b) a removal rate of particles with a threshold particle diameter being not less than 20%.

By using filters which individually satisfy these conditions, and by providing a first process with a circulation system and a second process with a multi-stage single passage, it is possible to efficiently remove foreign materials of a threshold particle diameter or larger from a carbonaceous material dispersion in which carbonaceous material particles are dispersed in a dispersing medium, with a high removal rate and in a relatively short time.

Under these conditions, the reference particle diameter is not particularly limited because it varies depending on the type of target particles in the dispersion, etc. However, to give an example, if, for example, the target particle is carbon black, it may be a value within the range of 0.05 to 10 µm, typically, for example, about 0.5 µm.

Here, the particle diameter at which the cumulative frequency is 99.8% or more in the particle diameter distribution means that the frequency F of particles having the particle diameter $d_i$ is obtained by dividing the total volume of particles having the particle diameter $d_i$ (wherein, i is a natural number from 1 to k, i≤k) by the total volume of all particles contained in the powder, as expressed in the following formula; and this frequency F is accumulated, and the diameter when the frequency F becomes 99.8% or more is the interested particle diameter. Incidentally, the particle diameter $D_{50}$, the so-called median diameter, at which the cumulative frequency becomes 50% in the particle diameter distribution is the average particle diameter on a volume basis referred to herein.

$$F = \frac{n_i V_i}{\sum V_i} = \frac{n_i V_i}{V_1 + V_2 + \cdots V_i + \cdots V_k}$$

wherein, $V_i$ is the volume of a particle having particle diameter $d_i$ and $n_i$ is the number of particles having particle diameter $d_i$.

Here, the particle diameter $d_i$ is obtained as the diameter of the smallest circle inscribed with the image of an individual particle obtained when the powder is observed with a microscope such as an optical microscope or an electron microscope, or as the longest side of the smallest rectangle inscribed with the image of an individual particle. For example, the particle diameter $d_i$ can be determined by visually or by using image analysis software, observing a plurality of particles (e.g., about 100 to 1000 particles, typically 100, 500 or 1000 particles, etc.) observed in an electron microscope image. The volume $V_i$ of the particles is the volume of a sphere having the diameter of the smallest circle described above, or having as its diameter the longest side of the smallest rectangle.

The threshold particle diameter is a value that is at least 5 µm larger than the reference particle diameter and corresponds to the lower limit of the particle diameter of the foreign materials to be removed. Specifically, for example, if the reference particle diameter is 10 µm, a value such as 15 µm, which is 5 µm larger than the reference particle diameter, or 20 µm, which is 10 µm larger than the reference particle diameter, can be set. Preferably, the threshold particle diameter is set within the range of 5 to 15 µm larger than the reference particle size.

Furthermore, regarding (a) the variation of cumulative undersize distribution Q [%] with respect to a reference particle diameter and the variation of non-volatile content, before and after passing the carbonaceous material dispersion, they are preferable to be not more than 0.1%, respectively.

Regarding (b) the removal rate of particles with the threshold particle diameter, it is more desirable to satisfy a condition that (b1) the removal rate of particles of the threshold particle diameter is not less than 50%.

Furthermore, in one embodiment of the present invention, as the individual filter device for the primary filter, it is possible to use a filter device which satisfies the conditions that:

(a) a variation of cumulative undersize distribution Q [%] with respect to a reference particle diameter and a variation of non-volatile content, before and after passing the carbonaceous material dispersion, being not more than 1%, respectively; and (b2) a removal rate of particles with a threshold particle diameter being not less than 50% and not more than 80%; and, as the individual filter device for the secondary filter, it is possible to use a filter device which satisfies the conditions that:

(a) a variation of cumulative undersize distribution Q [%] with respect to a reference particle diameter and a variation of non-volatile content, before and after passing the carbonaceous material dispersion, being not more than 1%, respectively; and (b3) a removal rate of particles with a threshold particle diameter being not less than 80% and not more than 90%.

In the primary filter of the circulation system, a relatively coarse filter is used to prevent clogging and increase in pressure loss, and in the secondary filter of the single passage system, a filter having smaller mesh can be used to improve the removal rate of foreign materials.

Here, it should be noted that even if the pore size or mesh conditions of the filter device(s) of the primary filter and the filter devices of the secondary filter are not different unlike the above one embodiment, but are the same, the difference between the circulation system and the single-pass system will cause a difference in the effect of removing foreign materials in each process, and the desired effects can be obtained. Therefore, the pore size or mesh conditions of the filter device(s) of the primary filter and the filter devices of the secondary filter may be the same.

With respect to a plurality of filter devices of the secondary filter, the pore size or mesh condition of each filter device can be common or different. In the case where the pore size conditions are different, it is preferable to set the pore size condition of the filter device located at the upstream side, especially the most upstream side, to be coarser than those of the downstream side. The same applies to the case where the primary filter is composed of a plurality of filter devices.

The number of filter devices in the primary filter may be one or more, but if the number increases more than necessary, the significance of using the circulation system would be diminished, so it is desirable to use no more than three, for example, although the number depends on the type and size of the filter device.

Further, regarding the number of times of circulation in the first process in the circulation system, although it depends on the characteristics of the filter device used, the number of units, and the like, but it is preferable that, for example, 98.2% to 99.98%, and in particular, 99.960% to 99.95%, of the foreign material contained in the carbonaceous material dispersion can be captured and removed in 20 times or less, and more preferably, 10 times or less.

Here, the "number of times of circulation" in the first process refers to, when a circulation flow path (closed flow path) is formed in which the dispersion that has passed through a primary filter from the upstream side returns to the upstream side of the same primary filter, the number of times that the dispersion passes through the primary filter. For example, to explain in the embodiment shown in FIG. 1, the dispersion to be treated, which is led from the previous process (in this example, the treatment at the magnetic filter 210) to the first process 300, is treated circularly in a circulation circuit (closed flow path) where the dispersion once enters the post-dispersion treatment tank 310, and from here, it passes through the primary filter (the two-stage depth filter 330), and after passing through the primary filter it is returned to the post-dispersion treatment tank 310. The number of cycles is counted as one cycle when substantially the same amount of the dispersion to be processed from the post-dispersion treatment tank 310 (initial liquid amount) passes through the primary filter 330, and after that, the number of cycles is increased by one for each subsequent cycle when substantially the same amount of the dispersion returned to the post-dispersion treatment tank 310 through the circulation circuit passes through the primary filter 330 again in the same way. The reason why we say "substantially" the same amount is to take into account the amount of reduction caused by the filtrate captured by the primary filter and the unavoidable reduction caused by adhesion to the wall or the like, while passing through the circulation flow path. Therefore, we believe that a person skilled in the art can easily understand the "substantial" amount of the same amount considering this amount of decrease based on the above explanation, and can also easily specify it according to the configuration of the system actually used.

The number of filter devices in the secondary filter should be at least two or more, but if the number increases more than necessary, the significance of combining with the first process of the circulation method would be diminished. For example, it is desirable to have no more than three, and more desirable to have two.

Next, the method of removing foreign material from a carbonaceous material dispersion in accordance with the first aspect of the present invention will be described more concretely, taking as an example the case where the method is implemented in one embodiment of a purification system for a carbonaceous material dispersion shown in FIG. 1.

Figure 1:
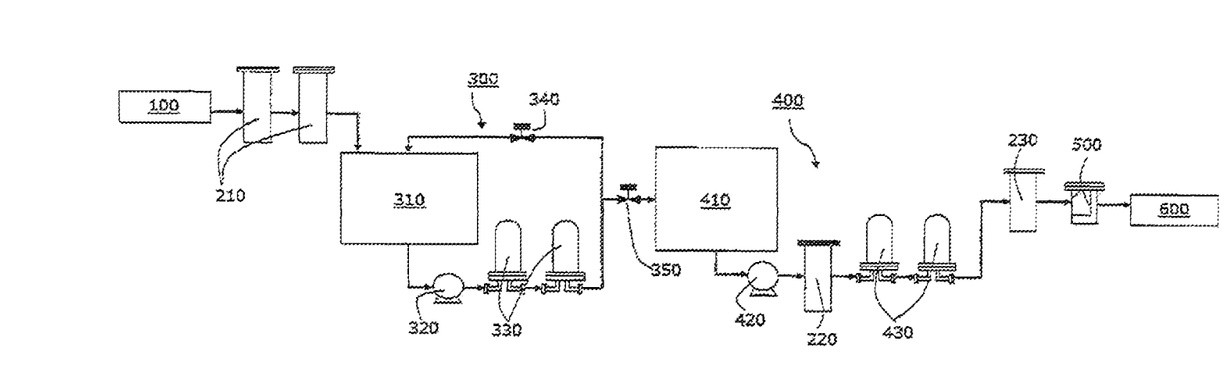
FIG. 1 is a block diagram schematically illustrating an apparatus configuration that may be used in implementing an embodiment of the method for removing foreign material according to the present invention.

FIG. 1 is a block diagram schematically illustrates an apparatus configuration that may be used in implementing an embodiment of a foreign material removal method according to the present invention.

In the method for removing foreign material from a carbonaceous material dispersion according to the first aspect of the present invention, the carbon material C to be treated is not particularly limited as long as it can have an electrical conductivity, and can be presented in a powdered or granulated form. For instance, graphite, carbon black (CB), carbon nanotubes (CNT), carbon nanofiber (CNF), carbon fiber (CF), fullerene, natural graphite, etc., may be used singly or in combination with two or more materials. As the carbon material, CB is particularly preferred. Furthermore, as the CB, for example, furnace black, channel black, acetylene black, thermal black, etc., are involved, any of which can be used. Among them, the acetylene black is desirable since it has an inherently low metallic component content due to its producing process.

Herein, the "powdered and/or granulated" form of the carbonaceous material is not particularly limited if the carbonaceous material can form a uniform dispersion by dispersing it in a dispersing medium. For example, it can include primary particles with an average particle diameter of about 10 to about 60 nm, secondary particles with an average particle diameter of about 1 to about 1,000 μm due to agglomeration of such primary particles or something like that, or processed particles with an average particle diameter of about 0.5 to about 5 mm by compression or granulation treatment, etc. In addition, the shape of the particles is not limited to a roughly spherical shape, but can also include an oval shape, flakes, needles or short fibers, irregular shapes, etc. The average particle diameter of the carbonaceous material is desirable to be in the range of not less than 0.5 mm and not more to 5 mm. Here, it is desirable that the average particle diameter of the carbonaceous material is not more than about 10 μm after the carbonaceous material has been dispersed in a dispersing medium to prepare a carbonaceous material dispersion.

The "average particle diameter" used herein means the average particle diameter $d_{50}$ (so-called median diameter) on a volume basis, as measured using a laser diffraction scattering particle diameter analyzer.

(Dispersion Preparation Process)

In the purification system for carbonaceous material dispersions shown in FIG. 1, a carbonaceous material dispersion to be treated is first prepared by stirring and mixing, at least, a carbonaceous material and a dispersing medium with a stirring device 100.

The dispersing medium used is not particularly limited and can be selected according to the purpose of use of the carbon material dispersion obtained by the producing method of the present invention. Any kind of dispersing medium including water and various organic solvents may be used. Furthermore, the dispersing medium used would show a liquid phase in the use temperature range of the carbonaceous material dispersion to be obtained. Although it not particularly limited, but it is, for example, liquid in a temperature range of about 0° C. to 100° C., or at least about 20° C. to 50° C.

For example, when the carbon material dispersion obtained by the method of the present invention is used for lithium-ion secondary battery applications, it is desirable to use an organic solvent.

Although the organic solvent is not limited to any medium as far as the medium can be removed by drying, specifically, as the organic solvent, for example, dibutyl ether; ester solvents such as ethyl acetate, ethyl propionate, propyl propionate, butyl propionate, pentyl propionate, hexyl propionate, heptyl propionate, octyl propionate, ethyl butyrate, propyl butyrate, butyl butyrate, pentyl butyrate, hexyl butyrate, heptyl butyrate, octyl butyrate, ethyl valerate, propyl valerate, butyl valerate, amyl valerate, hexyl valerate, heptyl valerate, octyl valerate, ethyl caproate, propyl caproate, butyl caproate, pentyl caproate, hexyl caproate, heptyl caproate, octyl caproate, ethyl heptanoate, propyl heptanoate, butyl heptanoate, pentyl heptanoate, hexyl heptanoate, heptyl heptanoate, octyl heptanoate, etc.; ketone solvents such as methyl ethyl ketone (MEK), methyl isobutyl ketone (MIBK), cyclohexanone (anon); non-protic polar solvents such as N,N-dimethylformamide (DMF), N,N-dimethylacetamide (DMAc), N-methyl-2-pyrrolidone (NMP), etc.; alkane solvents such as pentane, cyclopentane, hexane, cyclohexane, heptane, cycloheptane, octane, cyclooctane, nonane, decane, etc.; chain carbonates such as dimethyl carbonate, ethyl methyl carbonate, diethyl carbonate, etc.; cyclic carbonates such as ethylene carbonate, propylene carbonate, etc.; toluene, xylene, benzene, mesitylene, paraffin, carbon tetrachloride, etc., are exemplified. These can be used singly or in combination of any two or more members.

The carbon material dispersion to be prepared may include, for example, any dispersant to improve the dispersibility of the carbon material powder and/or granule in the above dispersing medium, any binder, and any other additives. It is naturally possible for these components to be blended into the carbon material dispersion after processing in the magnetic separation process described below. For example, in the case of all-solid electrolyte lithium secondary battery applications, these components or solid electrolytes, cathode active material or anode active material, etc. can be blended into the carbon material dispersion after processing in the magnetic separation process described below.

The stirring device 100 in preparing the carbonaceous material dispersion is not particularly limited, and in addition to media mills such as bead mills, stirrers having mechanical agitation mechanisms, media-less mills such as dispersers and homogenizers, homomixers for dispersion equipped with dispersing and shearing blades, ultrasonic agitators, static agitators with a flow channel structure, etc., may be used.

The viscosity of the carbon material dispersion prepared in this way is not particularly limited, but in order to ensure good migration of the metallic components present in the dispersing medium in the magnetic separation process described below, for example, it is desirable that the viscosity under 25° C. condition is in a range of about 10 to about 1000 mPa·s, preferably, in a range of about 10 to about 500 mPa·s, and more preferably, in a range of about 10 to about 300 mPa·s.

As for the content of carbon materials in the carbon material dispersion, it depends on the type of solvent used as the dispersing medium, but it is desirable that, for example, the content of the carbon material in the dispersing medium is in a range of about 10 to about 25% by mass based on the total mass of the carbon material dispersion.

(Magnetic Separation Process)

In the method for removing foreign materials from the carbonaceous material dispersion according to the present invention, after the dispersion preparation process as described above, a wet magnetic separation process in which a magnet element is placed in the obtained carbon material dispersion to remove metallic components from the carbon material dispersion may be provided. For example, in the purification system shown in FIG. 1, there are two magnetic filters 210 upstream from the first process 300, which is a filtration process of the circulation system, and one magnetic filter 220 upstream from a plurality of depth filters 410 in the second process 400, which is a filtration process of the single pass system, and further one magnetic filter 230 which is for confirmation downstream of the plurality of the depth filters 410.

In the method for removing foreign materials according to the present invention, such a wet magnetic separation process is optional, and the process can be incorporated independently of the first process, which is a filtration process of a circulation system using surface filter(s) or depth filter(s), and the second process, which is a filtration process of a single pass system using a multi-stage filter with surface filters or depth filters. As shown in the embodiment shown in FIG. 1 above, for example, the wet magnetic separation process is not limited to the wet magnetic separation process prior to the first process, and the wet magnetic separation process can be added between the first and second processes, or the wet magnetic separation process can be added after the second process, or the wet magnetic separation processes can be provided even in a plurality of these positions.

In the method for removing foreign material from a carbonaceous material dispersion according to the present invention, the carbonaceous material used in preparing the carbonaceous material dispersion may be one that has undergone a treatment for removing magnetic metal by dry magnetic separation in advance, separately from the treatment for removing magnetic metal by the wet magnetic separation process as described above. In Japanese Patent Application No. 2020-102342, filed on Jun. 12, 2020, the present inventors have previously proposed a suitable dry magnetic separation method for a carbonaceous material and a suitable purification method for a carbonaceous material dispersion in combination of the dry magnetic separation method and a wet magnetic separation method (In addition, U.S. patent application Ser. No. 17/345,373, filed on Jun. 11, 2021 is a US patent application with claiming the priority of the Japanese Patent Application.). The application of the magnetic separation method disclosed in the patent applications to the method for removing foreign material from the carbonaceous material dispersion according to the present invention is one of the preferred embodiments. The entire contents disclosed in the specifications, claims, and drawings of Japanese Patent Application No. 2020-102342 and/or U.S. patent application Ser. No. 17/345,373 are incorporated herein by the reference.

(The First Process of Removing Non-Magnetic Foreign Material)

In the purification system shown in FIG. 1, the carbonaceous material dispersion prepared in the stirring device 100 is first treated in the first process 300, which is the filtration process of the circulation system, after being treated in the two-stage magnetic filter 210 as necessary. That is, the carbonaceous material dispersion that has passed through the two-stage magnetic filter 210 is circulated for a predetermined number of times through a circulation line in which the carbonaceous material dispersion once enters the post-dispersion treatment tank 310, passes through the two-stage depth filter 330, and returns to the post-dispersion treatment tank 310. During this circulation treatment, the switching valve 340 on the circulation line is opened, while the switching valve 350 on the connection line from the first process 300 to the second process 400 described later is closed to secure the circulation line of the first process, and the circulation process is performed at a predetermined flow rate by driving a pressure feed pump 320. It is desirable to set a relatively high flow rate for this circulation process to increase the circulation efficiency.

(The Second Process of Removing Non-Magnetic Foreign Material)

After reaching a predetermined number of circulation times in the first process 300, the treated carbonaceous material dispersion is moved to the second process 400 and subjected to a single pass filtration treatment. In the purification system shown in FIG. 1, when a predetermined number of cycles is reached in the first process 300, the switching valve 340 is closed, while the switching valve 350 is opened to switch from the circulation line in the first process to the connection line to the second process 400, and the carbonaceous material dispersion treated in the first process is supplied to a post-pretreatment tank 410 of the second process 400. From here, the carbonaceous material dispersion is flowed to the two-stage depth filter 430 in a single pass by the pressure pump 420 for filtration treatment. In the purification system shown in FIG. 1, the magnetic filter 220 is arranged upstream of the two-stage depth filter 430 as described above, but the arrangement of the magnetic filter is optional. The feeding of the carbonaceous material dispersion to the filter (the two-stage depth filter 430) in the second process 400 should be performed at a lower flow rate compared to that in the first process in order to ensure that foreign materials still remaining in the carbonaceous material dispersion are captured by the filter in a single pass.

In the purification system shown in FIG. 1, the carbonaceous material dispersion, after being filtered in the second process in this manner, is finally passed through a magnetic filter 230 and a mesh strainer 500 for quality confirmation to become a product 600, but in the foreign material removal method according the present invention, the arrangement of the magnetic filter, the mesh strainer, and the like for quality confirmation is arbitrary. In addition, in the purification system shown in FIG. 1, two-stage depth filters 330 and 430 are arranged as filters in both the first process 300 and the second process 400, but the number and type of filters used in the first and second processes are not limited to the embodiment illustrated in FIG. 1, and can be changed in various ways under the conditions as described above.

In the above, the method of removing foreign materials according to the present invention has been explained by taking the case of an embodiment in which the object to be treated is a carbonaceous material dispersion as an example. However, since method of removing foreign materials according to the present invention is a method for removing a non-magnetic foreign material from an object to be treated, it is not limited to be applied to the carbonaceous material dispersion, but can be applied to a variety of dispersions.

In other words, a second aspect of the present invention is a method for removing foreign materials from a dispersion in which target particles each having a prescribed particle diameter or less are dispersed in a dispersing medium, the method comprising:

(i) a first process of applying the dispersion to a primary filter a specified number of times in circulation, the primary filter comprising at least one filter device, and in the circulation a procedure of applying the dispersion passed through the primary filter to the primary filter again being repeated from the second time until the specified number of times is reached; and (ii) a second process of applying the dispersion treated with the primary filter to a secondary filter a single time, the secondary filter comprising at least two filter devices arranged in series; and each respective filter device to be used satisfying following conditions:

(a) a variation of cumulative undersize distribution Q [%] with respect to a reference particle diameter and a variation of non-volatile content, before and after passing the dispersion, being not more than 0.1%, respectively; and (b) a removal rate of particles with a threshold particle diameter being not less than 20%, when a particle diameter of the carbonaceous material particles with a cumulative frequency of 99.8% or more being set as the reference particle diameter, and a value of not less than three times a particle diameter $D_{90}$ which is the size when a cumulative frequency is 90% in the particle diameter distribution of the target particles being set as the threshold particle diameter.

Thus, in the foreign material removal method according to the present invention, if the target particles to be dispersed in the dispersion are not specified to be carbonaceous materials as in the first viewpoint described above, it is possible to set the threshold particle diameter to a value of not less than three times a particle diameter $D_{90}$ which is the size when a cumulative frequency is 90% in the particle diameter distribution of the target particles.

Although it is not particularly limited, the particle diameter distribution of the target particles in the dispersion to be subjected to the present invention is relatively narrow in general, and it is assumed that that the span S, which is an index relating to the variation of the particle diameter, is not more than about 5, specifically, for example, about 3.1 to 4.2.

Here, the span S is defined as follows:

Span $S=(D_{90}-D_{10})/D_{50}$ wherein, $D_{90}$, $D_{10}$ and $D_{50}$ are the particle diameters at which the cumulative frequencies in the volume-based particle diameter histogram of the particles are 90%, 10% and 50%, respectively.

In this case, the threshold particle diameter of the particles to be removed as the foreign material is a value that is sufficiently larger than the particle diameter which the cumulative frequency in the particle diameter distribution of the target particles is 99.8% or more (the reference particle diameter), and as described above, it is sufficient to set the threshold particle diameter to a value that is not less than three times the particle diameter $D_{90}$. Incidentally, regarding the carbonaceous material dispersion, setting the threshold particle diameter to a value that is not less than three times the particle diameter $D_{90}$ is substantially the same as setting the threshold particle diameter to a value that is at least 5 μm larger than the reference particle diameter, as described above.

Further, in the foreign material removal method according to the second aspect of the present invention, it is desired that the span S of the particle diameter distribution of the target particles in the dispersion is 5 or less for more appropriate foreign material removal.

In the foreign material removal method according to the second aspect of the present invention, regarding the suitable conditions and detailed conditions, etc., other than those relating to the prescription of the threshold particle diameter described above, those mentioned in the foreign material removal method according to the first aspect of the present invention described above are applicable, so that the detailed description here is omitted to avoid duplication.

EXAMPLE

The present invention will be described in more detail by way of examples below. However, it should be understood that the present invention is not limited to the following examples as long as it does not deviate from the spirit and scope of the present invention.

(Preparation of Carbonaceous Material Dispersion for Testing)

A carbonaceous material dispersion for testing was prepared as follows, as the material to be treated used in the following examples and reference examples.

First, 20 parts by mass of acetylene black, 79 parts by mass of N-methyl-2-pyrrolidone (NMP) as a dispersing medium, and 1 part by mass of carboxymethyl cellulose as a dispersing agent are dispersed in a bead mill to prepare 10 kg of acetylene 10 kg of the acetylene black dispersion (the magnetic component was previously removed by magnetic treatment to a mass fraction of $4\times10^{-8}$ with respect to the acetylene black) was prepared. Then, 10 mg of metal powder (copper powder) with a particle diameter of 20 μm or more, which had been trapped in a 20 μm mesh by sieving with the mesh, was added and mixed thoroughly to make a carbonaceous material dispersion for testing. Incidentally, when converted as 20 μm spherical particles, 10 mg of this copper powder has 26,442.43 particles. In this carbonaceous material dispersion for testing, the particle diameter of acetylene black particles having a cumulative frequency of 99.8% or more in the particle diameter distribution (reference particle diameter) was 8.81 μm. The viscosity of the carbonaceous material dispersion for testing was 263 mPa·s at 25° C.

(Pre-Selection of Filter Device)

A polypropylene nonwoven depth filters were employed as the filter devices, and two type filters which had no effect on particles with a diameter of 10 μm or less were selected, after selecting the filter that had no influence on the acetylene black in the carbonaceous material dispersion for testing.

In other words, filters were selected for which there was no change in the physical properties of the acetylene black dispersion liquid in terms of (1) nonvolatile content, (2) particle diameter distribution, and (3) B-type viscometer values. In detail, (1) no change in the mass of the carbonaceous material (acetylene black), which is the main material, was confirmed from the concentration of nonvolatile content. To analyze the nonvolatile content, 10 g of the dispersed solution was taken before and after passing through the filter and dried at 140° C. for 5 hours, and it was confirmed that the non-volatile content change was no more than 0.5% by mass relative to the original non-volatile content value. (2) The absence of change in the particle diameter distribution was confirmed by measuring the particle diameter distribution and finding that the change in the cumulative undersize distribution (Q) relative to the reference particle diameter (8.81 μm) was 0.1% or less. In addition, (3) no change in the numerical value of the B-type viscometer was confirmed by finding that the change in viscosity at room temperature (25° C.) was within ±10 mPa·s from the average value of the measurements before and after passing through the filter. Here, a sample was taken every 10 passes through the filter, and after passing through the filter up to 50 passes, the non-volatile content, viscosity and particle diameter distribution of the sample were measured as described above, and the above evaluation was performed on the average value of the five samples.

As a result, a depth filter (hereinafter referred to as "filter A") having no change in the physical properties of the acetylene black dispersion solution in terms of (1) to (3) above and having a removal rate of 74% for particles of 20 μm, which was a threshold particle diameter, and a depth filter (hereinafter referred to as "filter B") having no change in the physical properties of the acetylene black dispersion solution in terms of (1) to (3) above and having a removal rate of 86% for particles of 20 μm were selected. The removal rate was determined by using AC dust (Automotive Air Cleaner Test Dust) specified as A4 (Coarse) in ISO 12103-1 (2016) [Road vehicles—Test contaminants for filter evaluation Part 1: Arizona test dust] as test particles, and at the concentration of 264 ppm, and flowing at a flow rate of 11.4 liters/minute against a 10-inch cartridge.

Reference Example 1

The foreign material removal treatment was carried out in a single pass process, in which 10 kg of the carbonaceous material dispersion for testing was passed through a flow path in which the filter devices were arranged in multiple stages in series. The filter A with a removal rate of 74% was used as the first-stage filter device, and the filters B with a removal rate of 86% were used for the second and subsequent stages. The results obtained are shown in Table 1.

TABLE 1

| Number of stages | One stage | Two stages | Three stages | Four stages | Five stages | Six stages |
|---|---|---|---|---|---|---|
| Removal rate | 74.856% | 96.492% | 99.458% | 99.931% | 99.992% | 99.999% |

By using a multistage filter with five or more stages and passing the test carbonaceous material dispersion through it a single time, it was confirmed that the collected mass of foreign materials (copper particles) in the dispersion was 1 µg or less and the removal rate was 99.99% or higher.

However, due to the pressure loss in the flow path system, it was necessary to install a pump in every two stages of the filter system, so a total of three pumps were necessitated. 100 kg/h processing took one hour.

Reference Example 2

The foreign material removal treatment was performed by circulating 10 kg of the carbonaceous material dispersion for testing in a circulation channel in which a filter A with a removal rate of 74% and a filter B with a removal rate of 86% were arranged in series. The results obtained are shown in Table 2.

TABLE 2

| Circulation times | 1 | 2 | 3 | 4 | 5 |
|---|---|---|---|---|---|
| Removal rate | 63.915% | 87.231% | 95.564% | 98.252% | 99.256% |
| Circulation times | 6 | 7 | 8 | 9 | 10 |
| Removal rate | 99.753% | 99.908% | 99.977% | 99.993% | 99.999% |

By circulating nine times, it was confirmed that the collected mass of foreign materials (copper particles) in the dispersion was 1 µg or less and the removal rate was 99.99% or higher. Although only one pump was needed to be distributed in the circulation path, it took 10 hours at a flow rate of 100 kg/h.

Example 1

As the first process, 10 kg of the carbonaceous material dispersion for testing was circulated and treated in a circulation flow path in which a filter A with a removal rate of 74% and a filter B with a removal rate of 86% were arranged in series, and as the second process, the carbonaceous material dispersion for testing after the treatment in the first process was treated once in a flow path in which a filter A with a removal rate of 74% and a filter B with a removal rate of 86% were arranged in series.

As a result of circulating filtration with a circulation frequency of 6 times in the first process, followed by multi-stage (2-stage) single treatment in the second process, the collected mass of foreign materials (copper particles) in the dispersion was 0.47 µg, and it was found that the removal rate was 99.995% or more. The collected mass was the lowest compared with Reference Examples 1 and 2. In addition, the number of filters could be reduced to four, and the treatment time required was seven hours.

Example 2

In Example 1, the number of times of circulation and filtration in the first process was changed to seven times, and it was followed by the same multi-stage (2-stage) single treatment in the second process. As a result, it was found that the collected mass of foreign materials (copper particles) in the dispersion was 0.16 µg, and the removal rate was 99.998% or more, which enabled further removal. The treatment time was 8 hours.

The average particle diameter, viscosity of the dispersion, metal component content in the dispersion, and acetylene black (carbon black) yield in the dispersion shown in the above examples, and reference examples were measured according to the following criteria.

(Particle Diameter)

The particle diameter distribution was measured using a laser diffraction scattering particle diameter analyzer (Horiba LA-960).

(Viscosity of Dispersion)

The values were obtained by measuring with a B-type viscometer (TVB-15, Toki Sangyo Co., Ltd.) at a temperature of 25° C. (rotor No. 21, 60 rpm).

(Non-Magnetic Metal Component (Cu) Content in Dispersion)

To examine the Cu concentration in acetylene black dispersion, first the acetylene black dispersion was weighed, then NMP, which was a dispersing medium, was evaporated and dried, and then the resultant was pre-treated by adding nitric acid for heat decomposition. Then, the acetylene black and the acid decomposition solution were separated by filter paper, and the separated acid decomposition solution was measured by high-frequency inductively coupled plasma atomic emission spectrometry (ICP-AES) (instrument name: SPECTRO ACROS MV130 FHM22, manufactured by Spectro).

The concentration of the measurement results was converted from the mass of the original weighed acetylene black dispersion to the mass of the collected Cu, since the measured concentration was the concentration in the acid decomposition solution.

EXPLANATION OF SIGN

100 Stirring device
300 First process
330 Depth Filter
400 Second process
430 Depth Filter

What is claimed is:

1. A method for removing foreign materials from a carbonaceous material dispersion in which carbonaceous material particles are dispersed in a dispersing medium, the method comprising:
    (i) applying the dispersion to a primary filter a specified number of times in circulation, the primary filter comprising at least one filter device, comprising repeatedly applying the dispersion to the primary filter a number of times after it has been passed through the primary filter once, until the specified number of times is reached; and
    (ii) applying the dispersion treated by the primary filter to a secondary filter a single time, the secondary filter comprising at least two filter devices arranged in series;
    wherein each respective filter device satisfies the following conditions:

(a) a variation of a cumulative undersize distribution Q [%] with respect to a reference particle diameter, and a variation of non-volatile content, before and after being applied to each respective filter element, are not more than 0.1%, respectively; and (b) a removal rate of particles with a threshold particle diameter being not less than 20%;

wherein the reference particle diameter is set as a particle diameter of the carbonaceous material particles having a cumulative frequency of 99.8% or more, and the threshold particle diameter is set as a value of at least 5 µm greater than the reference particle diameter; and wherein the carbonaceous material is one or more selected from the group consisting of graphite, carbon black, carbon nanotubes, carbon nanofiber, carbon fiber, fullerene, and natural graphite.

2. The method for removing foreign materials according to claim 1, wherein 99.99% or more of the foreign materials with a particle diameter greater than or equal to the threshold particle diameter are collected.

3. The method for removing foreign materials according to claim 1, wherein each respective filter device to be used satisfies following conditions:

(a) a variation of the cumulative undersize distribution Q [%] with respect to a reference particle diameter, and a variation of non-volatile content, before and after being applied to each respective filter element, are not more than 0.1%, respectively; and (b1) a removal rate of particles with a threshold particle diameter being not less than 50%.

4. The method for removing foreign materials according to claim 1, wherein each respective filter device in the primary filter satisfies following conditions:

(a) a variation of the cumulative undersize distribution Q [%] with respect to a reference particle diameter, and a variation of non-volatile content, before and after being applied to each respective filter element, are not more than 0.1%, respectively; and (b2) a removal rate of particles with a threshold particle diameter being not less than 50% and not more than 80%; and wherein each respective filter device in the secondary filter satisfies following conditions:

(a) a variation of the cumulative undersize distribution Q [%] with respect to a reference particle diameter and a variation of non-volatile content, before and after being applied to each respective filter element, being not more than 0.1%, respectively; and (b3) a removal rate of particles with a threshold particle diameter being not less than 80% and not more than 90%.

5. The method for removing foreign materials according to claim 1, wherein each filter device is a depth filter.

6. The method for removing foreign materials according to claim 1, wherein the carbonaceous material dispersion has been subjected to a wet magnetic separation in which the dispersion is passed through a magnetic filter prior to applying it to the primary filter.

7. The method for removing foreign materials according to claim 1, wherein the carbonaceous material particles used in the carbonaceous material dispersion has been subjected to a dry magnetic separation prior to being dispersed in the dispersing medium.

8. The method for removing foreign materials according to claim 1, wherein the carbonaceous material is carbon black.

* * * * *